United States Patent [19]

Schupak

[11] Patent Number: 5,557,675

[45] Date of Patent: Sep. 17, 1996

[54] COMPUTER CONTROLLED AUDIO-VISUAL SYSTEM

[76] Inventor: Donald Schupak, Schupak Group, 730 Fifth Ave., Suite 1901, New York, N.Y. 10019

[21] Appl. No.: 240,329

[22] Filed: May 10, 1994

[51] Int. Cl.[6] .............................. H04N 7/16; H04N 7/08; H04N 5/268
[52] U.S. Cl. ...................... 380/10; 380/15; 348/552; 348/659; 348/705
[58] Field of Search ...................... 380/10, 15; 348/552, 348/553, 659, 705, 706, 720

[56] References Cited

U.S. PATENT DOCUMENTS

| | | | |
|---|---|---|---|
| Re. 29,997 | 5/1979 | den Toonder | 325/308 |
| Re. 34,611 | 5/1994 | Fenwick et al. | 380/10 X |
| 3,717,813 | 2/1973 | Lieberman et al. | 325/3 |
| 4,322,745 | 3/1982 | Saeki et al. | 358/123 |
| 4,439,784 | 3/1984 | Furukawa et al. | 358/86 |
| 4,546,382 | 10/1985 | McKenna et al. | 358/84 |
| 4,677,686 | 6/1987 | Hustig et al. | 455/5 |
| 4,704,725 | 11/1987 | Harvey et al. | 380/9 |
| 4,761,684 | 8/1988 | Clark et al. | 358/86 |
| 4,864,632 | 9/1989 | Moriyama et al. | 455/3 |
| 4,866,787 | 9/1989 | Olesen | 455/3 |
| 4,894,789 | 1/1990 | Yee | 364/521 |
| 4,996,597 | 2/1991 | Duffield | 455/135 X |
| 5,016,272 | 5/1991 | Stubbs et al. | 380/5 |
| 5,019,910 | 5/1991 | Filmer | 455/12 X |
| 5,099,422 | 3/1992 | Foresman et al. | 364/401 |
| 5,105,268 | 4/1992 | Yamanouchi et al. | 358/84 |
| 5,132,992 | 7/1992 | Yurt et al. | 375/122 |
| 5,151,789 | 9/1992 | Young | 358/194.1 |
| 5,181,107 | 1/1993 | Rhoades | 358/86 |
| 5,193,208 | 3/1993 | Yokota et al. | 455/4.1 |
| 5,204,662 | 4/1993 | Oda et al. | 340/825.25 |
| 5,249,043 | 9/1993 | Grandmougin | 358/86 |
| 5,249,044 | 9/1993 | Von Kohorn | 358/86 |
| 5,387,945 | 2/1995 | Takeuchi | 348/552 X |

OTHER PUBLICATIONS

"The VCR Interface", NCTA Technical papers, 1986, pp. 197–202.
"Tac–Timer", NCTA Technical Papers, 1986, pp.203–206.

*Primary Examiner*—Gilberto Barrón, Jr.
*Attorney, Agent, or Firm*—Cooper & Dunham LLP

[57] ABSTRACT

A computer receiving an audio/video signal for controlling an audio/video system including at least one television, comprising a tuner for tuning a selected channel from among a plurality of channels present in the audio/video signal, a descrambler receiving the tuned selected channel for descrambling a scrambled signal, and means for selecting the audio/video signal, an output of the tuner, an output of the descrambler, or an output of the mass storage unit to be supplied to said television in response to user input.

17 Claims, 4 Drawing Sheets

COMPUTER CONTROLLED AUDIO-VISUAL SYSTEM

BACKGROUND OF THE INVENTION

1. Field of the Invention

The present invention relates to a computer controlled audio-visual apparatus and, more particularly, to a computer connected to a cable service for controlling at least one of a television, a videocassette recorder, or a compact disk reading/writing device.

2. Description of the Background

Modern television viewers have a great many choices in deciding upon which programs they wish to view. In addition to the free broadcast channels in the VHF and UHF frequency range that standard television receivers are adapted to receive using an antenna, a television viewer may opt to subscribe to a cable television service and receive additional channels through a cable brought into his home from outside and connected directly to the television receiver. On the other hand, a viewer may purchase a satellite antenna system in order to receive satellite broadcast channels, thereby expanding the frequency coverage otherwise provided by a standard television receiver.

In addition to the basic, or unscrambled channels carried on the cable television and satellite broadcast systems, there may be certain channels that are scrambled, that is, channels that require decoding of an encoded signal before they are in a condition to be displayed on the viewer's television. Upon paying an additional fee the cable subscriber can be provided with a code or decoder to permit viewing the coded programs on a continuous basis or on a pay per-view basis.

OBJECTS AND SUMMARY OF THE INVENTION

Accordingly, it is an object of the present invention to provide a system wherein a computer is connected to a source of audio and video signals and distributes the input signals to at least one of a television, a videocassette recorder, or a compact disk reading/writing device based upon user input.

It is another object of the present invention to provide a system employing a computer for supplying any of a tuned channel, a stored signal, or a descrambled channel to a television.

It is yet another object of the present invention to provide a computer for supplying any of a tuned channel, a stored signal, or a descrambled channel to a plurality of televisions and/or other audio/video components such as, for example, a videocassette recorder or a compact disk reading and/or writing device.

It is yet another object of the present invention to provide a computer for supplying any of a tuned channel, a stored signal, or a descrambled channel to a plurality of televisions and/or other audio/video components such as, for example, a videocassette recorder or a compact disk reading and/or writing device via a radio-frequency transmitter/receiver link.

The above and other objects, features, and advantages of the present invention will become apparent from the following detailed description of preferred embodiments to be read in conjunction with the accompanying drawings.

DETAILED DESCRIPTION OF THE DRAWINGS

Figure 1:
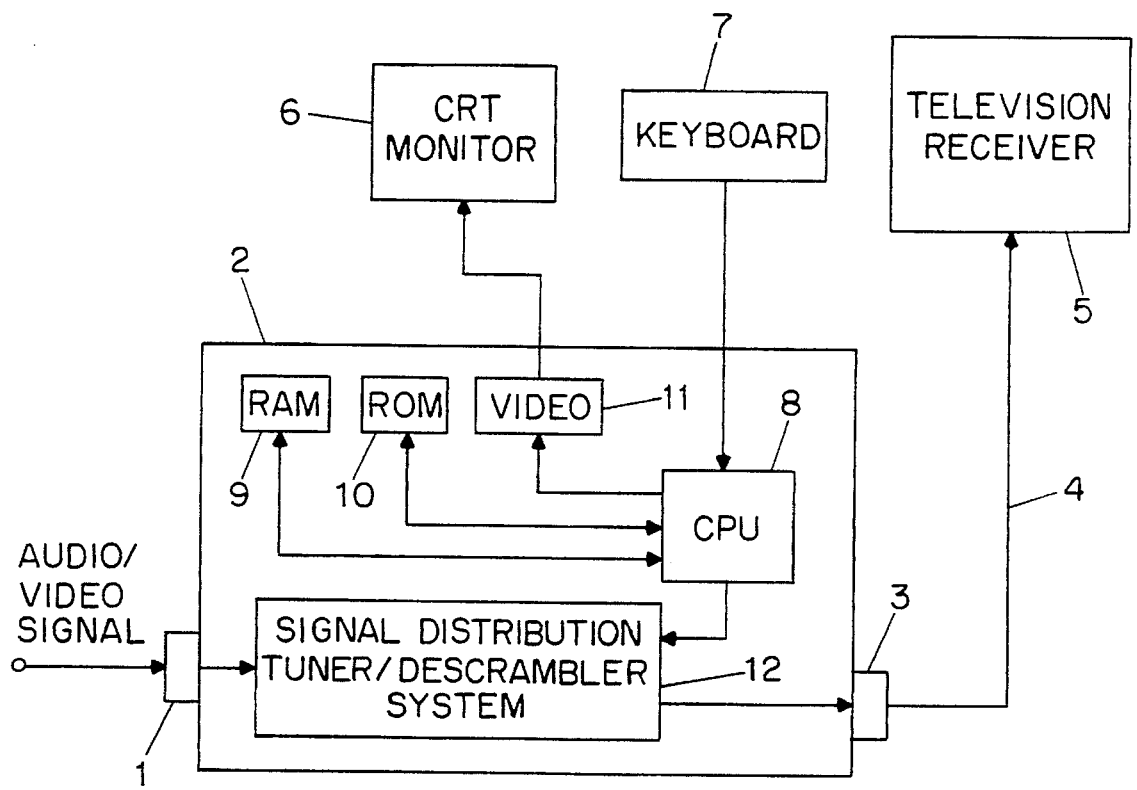
FIG. 1 is a block diagram schematically showing the structure of a computer controlled audio-visual system according to a first embodiment of the present invention.

Referring now to FIG. 1, an audio/video signal is input at a terminal 1 of computer 2 from a program source (not shown), such as a broadcast television antenna, a cable television system, or a satellite broadcast receiver. In addition to the functions described below, the computer 2 is capable of carrying out traditional functions such as, for example, word processing and database storage. The computer 2 outputs an audio/video signal at terminal 3. The output audio/video signal from terminal 3 is carried by cable 4 to television receiver 5. The computer 2 includes a standard CRT monitor 6 and a keyboard 7, as well as a standard control processing unit 8, RAM and ROM memories 9 and 10, video output circuit 11, and signal distribution/tuner/descrambler system 12, shown in more detail in FIG. 2.

Figure 2:
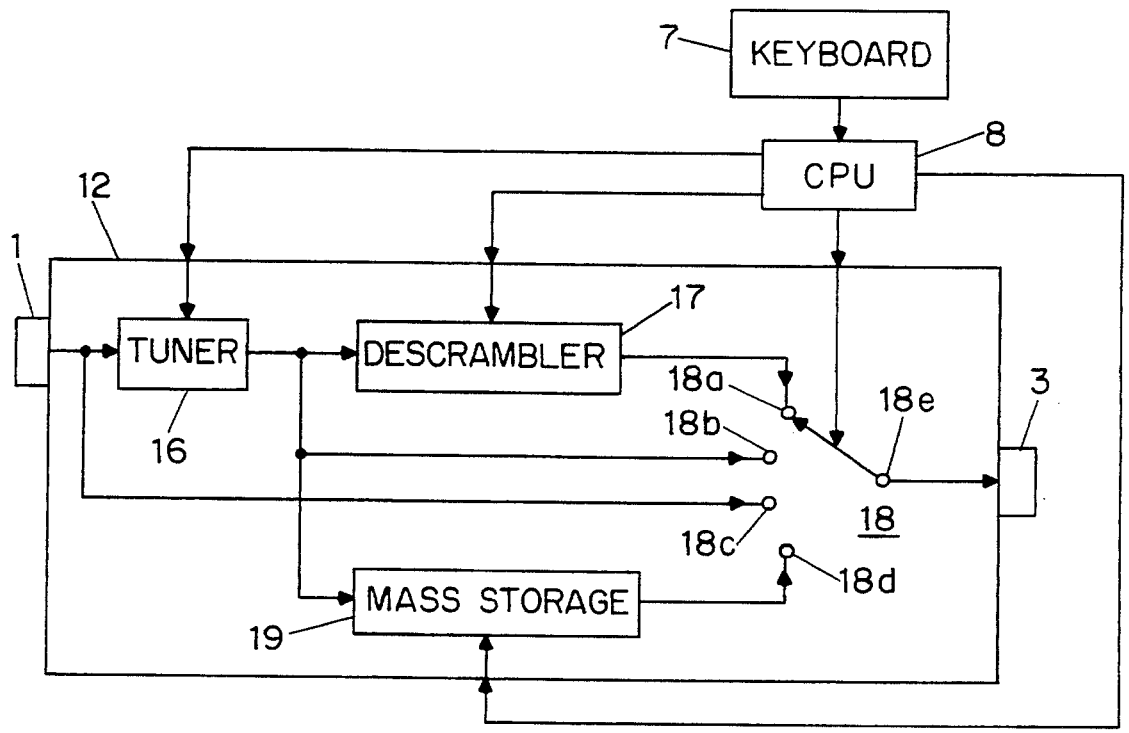
FIG. 2 is a block diagram schematically showing the structure of the computer shown in FIG. 1.

As seen in FIG. 2, system 12 includes a tuner 16 that receives the audio/video signal input at terminal 1 and that is adapted to tune to a particular channel in response to user input by the keyboard 7 connected to the CPU 8. The tuner 16 feeds the selected tuned channel to a descrambler 17. Descrambler 17 decodes, or unscrambles the selected tuned channel that has been scrambled by the program source provider, that is, either the cable television provider or the satellite broadcast provider.

The descrambler 17 descrambles signals based upon an agreement with the program source provider. For example, the descrambler 17 may descramble signals after receiving an access code that is input to the CPU 8 by the user operating the keyboard 7. The access code may be provided either on a program-by-program or month-by-month basis from the program provider.

The descrambler 17 feeds a descrambled signal to contact 18a of switch 18. Switch 18 also receives, at contact 18b, the selected tuned channel that is output from tuner 16, and at contact 18c, the audio/video signal received at terminal 1. Further, the system 12 may include a mass storage unit 19 that receives a signal from tuner 16 and that stores the signal for later replay. The output of mass storage unit 19, that is, the stored tuned signal is fed to contact 18d of switch 18 in response to user input to the CPU 8 from keyboard 7 requesting playback of the stored signal.

Switch 18 is controlled by CPU 8 to provide one of the four signals available at contacts 18a–18d to contact 18e in response to user input to the keyboard 7. Contact 18e in turn provides the selected signal to terminal 3, whereafter the signal is carried by cable 4 to television receiver 5, as shown in FIG. 1.

As seen by the above description, computer 2 receives an input audio/video signal from a program source and may provide, in response to user input, any of a tuned, descrambled signal, a tuned signal, an un-tuned signal, or a stored signal to the television receiver 5.

The mass storage unit 19 may be an optical or magneto-optical mass storage unit and the descrambler 17 may be programmed to descramble signals that have undergone various encoding schemes.

Figure 3:
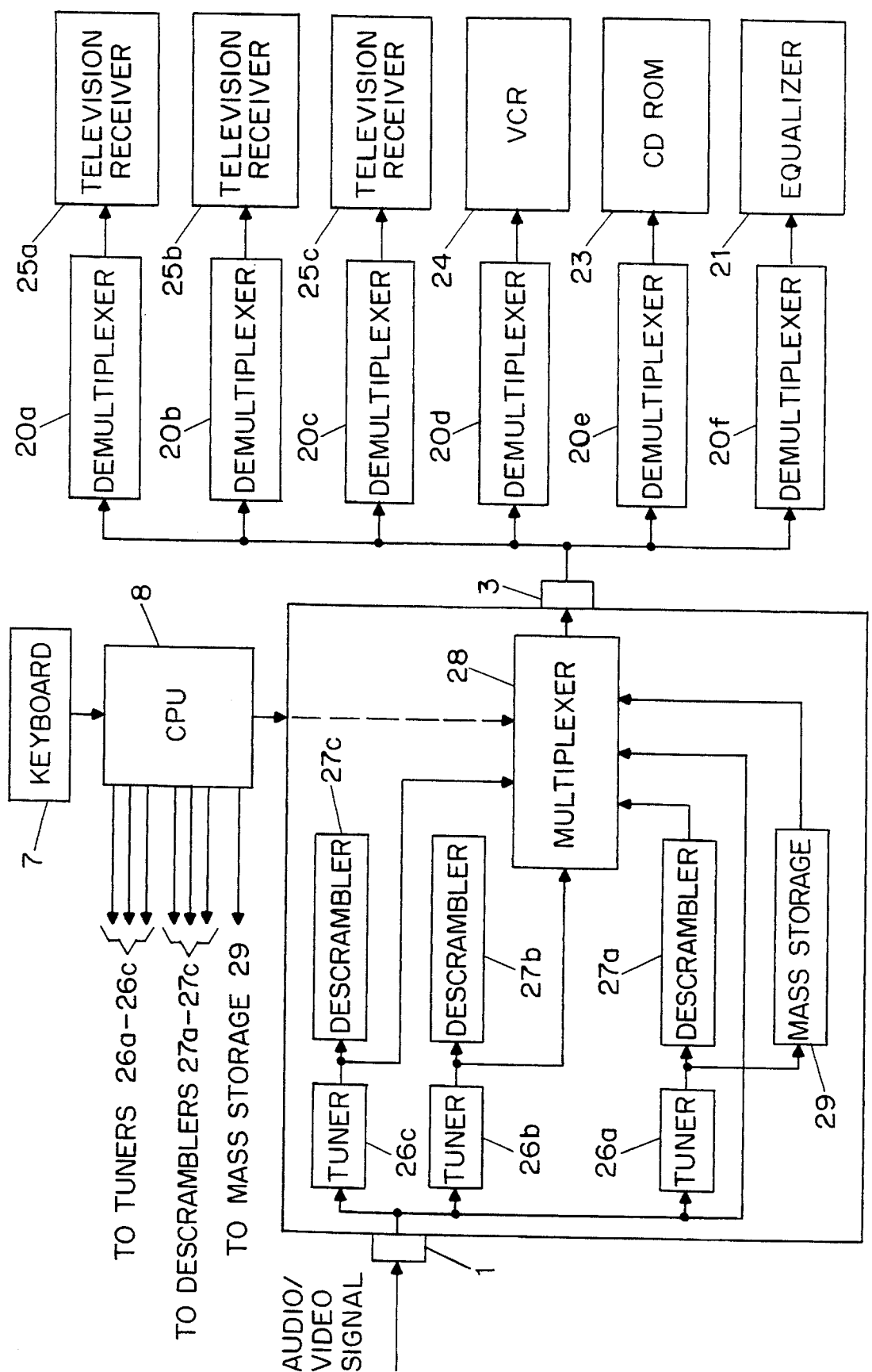
FIG. 3 is a block diagram schematically showing the structure of a computer controlled audio-visual system according to a second embodiment of the present invention.

Turning now to FIG. 3, wherein the same reference numerals of FIGS. 1 and 2 apply to the same parts and therefore do not require detailed description, it is seen that the signal output from terminal 3, which is carried by cable 4, may be received by more than one television receiver, depicted in this FIG. as elements 25a–25c. In this embodiment, the system 22 includes tuners 26a–26c and descramblers 27a–27c. Tuner 26a feeds descramber 27a and mass storage unit 29 as in the first embodiment. Tuner 26a also feeds multiplexer 28 directly. Tuners 26b and 26c receive the input audio/video signal from terminal 1 and, in response to user input to the CPU 8 from the keyboard 7 feed a selected tuned channel to respective descramblers 27b and 27c. The outputs of descramblers 27b and 27c as well as the outputs of tuners 26b and 26c are fed to multiplexer 28. Multiplexer 28 is also supplied with the input audio/video signal. Thus, in response to user input to the CPU 8, multiplexer 28 is capable of multiplexing any of the tuner and descrambler outputs as well as the output from the mass storage unit 29 and the original audio/video signal input to terminal 1. Further, before being passed to the televisions 25a–25c via cable 4, the output of multiplexer 28 is passed through respective demultiplexers 20a–20c. These demultiplexers 20a–20c are adapted to allow each television 25a–25c to receive different channels for display based upon the signals provided by the multiplexer 28 in response to user input to the CPU 8 from the keyboard 7.

Although the descramblers 27a–27c are shown as individual units, they may be embodied by software performed by the computer 2. The multiplexer 28 can also be embodied by software.

In addition, VCR 24, CD Rom 23, and Equalizer 21 may be connected to cable 4 through respective demultiplexers 20d–20f in order to record and/or process signals provided by the system 22 through cable 4.

Further, VCR 24 may be connected to data port 15 of the system 22 via data line 16. Data Port 15 may receive data from the CPU 8 through control card 15a. Through data card 15a, data port 15 and data line 16 the system 22 is capable of controlling the operating state of the VCR 24. The CPU 8 may be programmed to prompt the user for keyboard input, via the monitor 6, for information regarding the operation of the VCR such as, for example, record start and stop times. It should be noted that the system 22 may also be adapted to control the operating state of other components connected thereto, such as, for example, the equalizer or the CD Rom.

Figure 4:
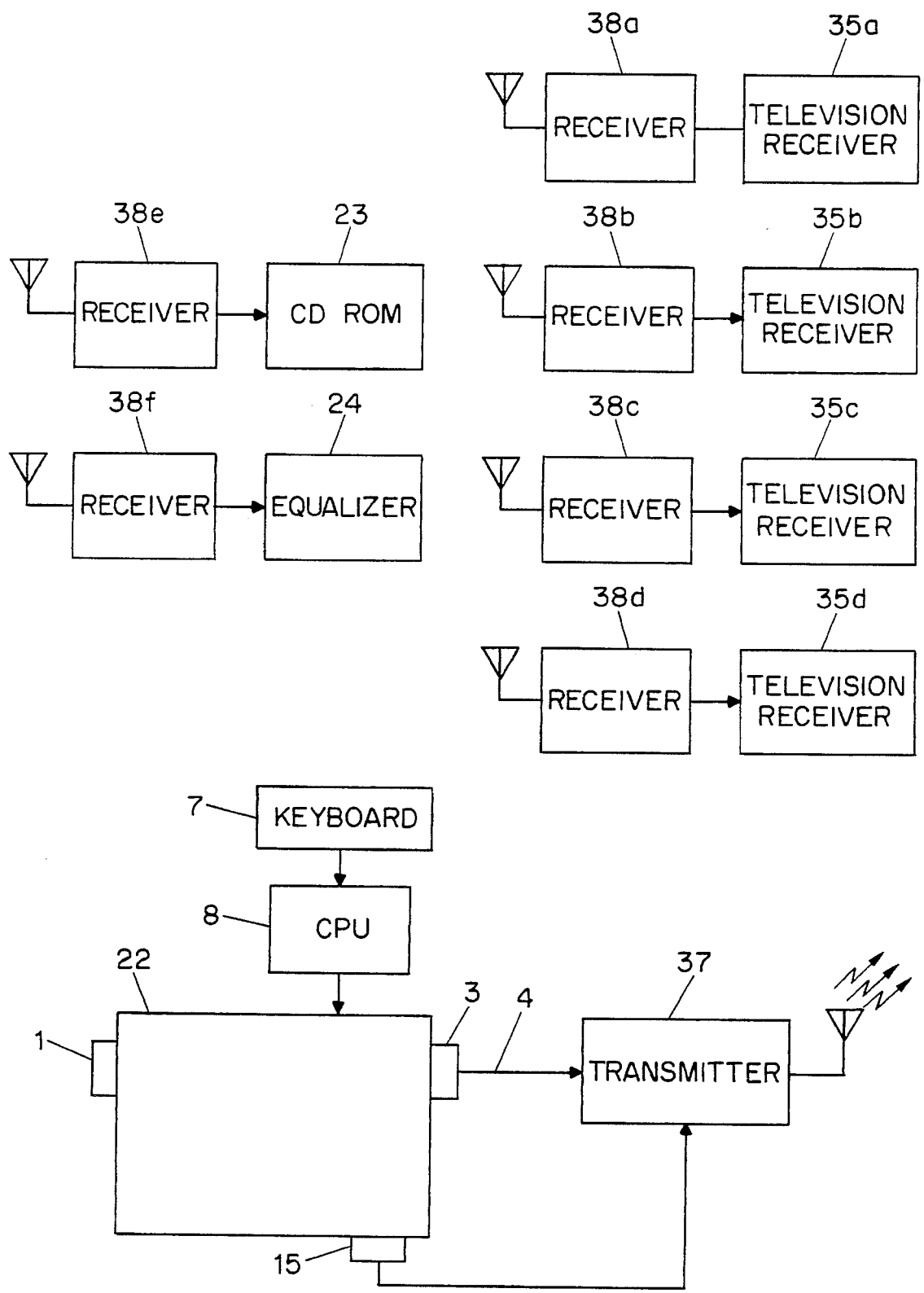
FIG. 4 is a block diagram schematically showing the structure of a computer controlled audio-visual system according to a third embodiment of the present invention.

FIG. 4 shows a third embodiment of the present invention wherein the same reference numerals of FIG. 3. apply to the same parts and therefore do not require detailed description. In this FIG., it is seen that the signal output from terminal 3, which is carried by wire 4, may be transmitted by a wireless transmitter 37 to respective receivers 38a–38f.

In this embodiment the transmitter 37 is connected to the data port 15 of system 22 and controls, in response to user input to the CPU 8 from the keyboard 7, which portion of the multiplexed signal is received by each of the receivers. That is, each receiver may be provided with a different address, and the transmitter 37 may be adapted to transmit a portion of the multiplexed signal to a particular receiver address in response to input from a user to the CPU 8.

Figure 5:
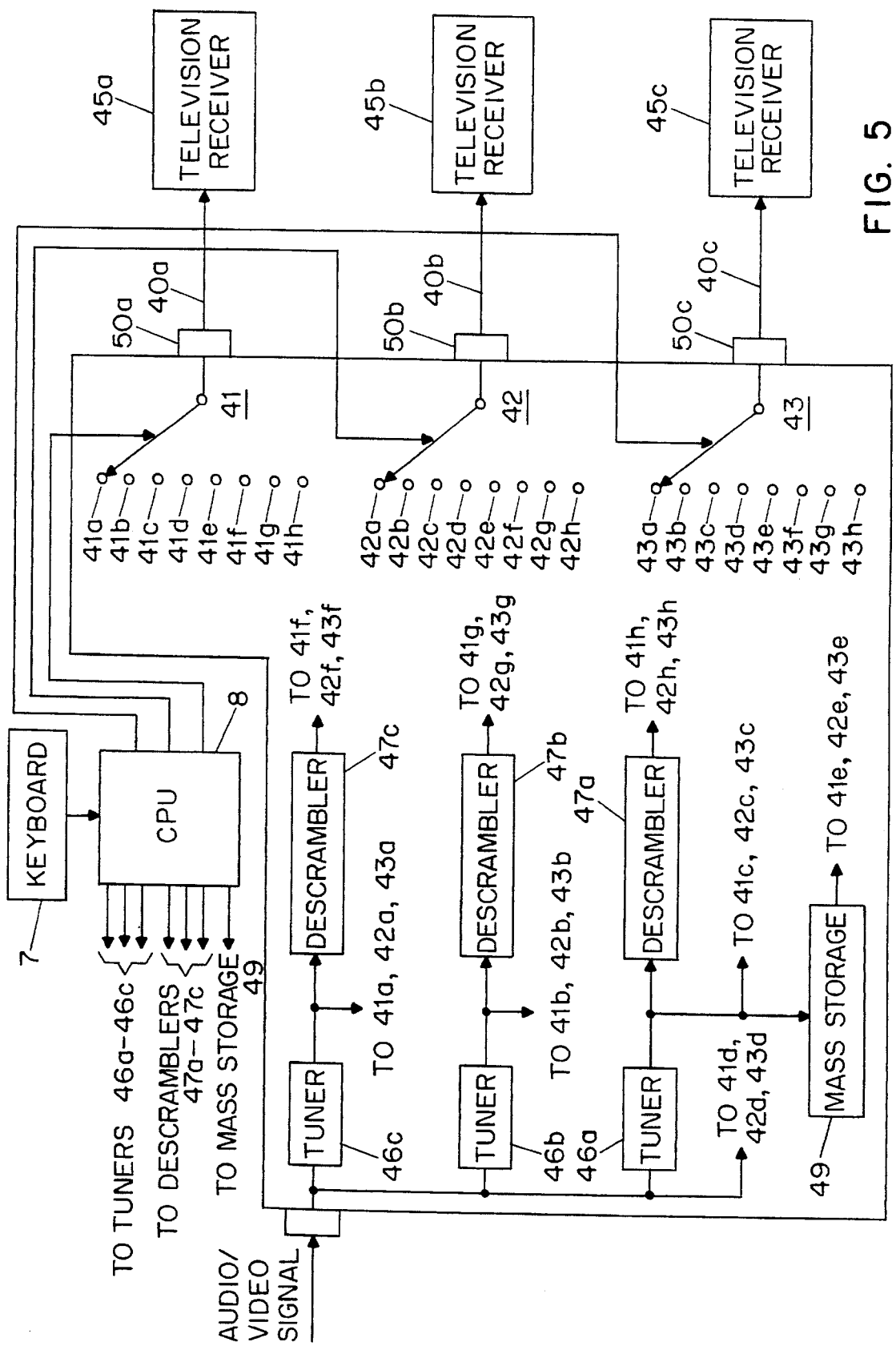
FIG. 5 is a block diagram schematically showing the structure of a computer controlled audio-visual system according to a fourth embodiment of the present invention.

Turning now to FIG. 5 a fourth embodiment of the instant invention is shown, wherein the same reference numerals of FIG. 3 apply to the same parts and therefore do not require detailed description. In this FIG., it is seen that the signal output from tuners 46a–46c, descramblers 47a–47c, mass storage unit 49, and the input audio/video signal are all fed to respective contacts 41a–41h of switch 41, contacts 42a–42h of switch 42, and contacts 43a–43h of switch 43. In response to user input from keyboard 7, switch 41 is controlled by CPU 8 to output any one of the channels input thereto to the television receiver 45a via terminal 50a and cable 40a. Switch 42 is controlled by CPU 8 to output any one of the channels input thereto to the television receiver 45b via terminal 50b and cable 40b. Switch 43 is controlled by CPU 8 to output any one of the channels input thereto to the television receiver 45c via terminal 50c and cable 40c.

While generally communication is shown from the computer to the television receiver, such communication can also flow back to the computer from the television receiver. A touch screen or the like can be provided, or the standard television remote control unit may be utilized, to permit the user remotely located from the computer to provide commands and instructions back to the computer.

Finally, it must be noted that although the present invention is described by reference to particular embodiments thereof, many changes and modifications of the invention may become apparent to those skilled in the art without departing from the spirit and scope of the invention, which is only limited by the appended claims.

What is claimed is:

1. A computer apparatus receiving an audio/video signal for controlling, in response to user input, an audio/video system including a plurality of audio/video components, comprising:

a central processor receiving said user input;

a plurality of tuners receiving a respective plurality of tuner control signals from said central processor for tuning a plurality of selected channels from among a plurality of channels present in said audio/video signal;

a plurality of descramblers receiving a respective plurality of descrambler control signals from said central processor and a respective plurality of tuned selected channels for descrambling the plurality of tuned selected channels when said plurality of tuned selected channels have been scrambled;

a multiplexer receiving a multiplexer control signal from said central processor and said plurality of tuned selected channels, a plurality of descrambled signals, and said audio/video signal for multiplexing into a multiplexed signal in response to said multiplexer control signal; and means for providing said multiplexed signal to a plurality of demultiplexers, each of said plurality of demultiplexers outputting a demultiplexed signal to one of said plurality of audio/video components.

2. The apparatus of claim 1, wherein said computer includes a keyboard for receiving said user input.

3. The apparatus of claim 1, wherein said plurality of descramblers are adapted to descramble said plurality of tuned selected channels only after being provided with an access code from said central processor.

4. The apparatus of claim 1, further comprising a mass storage unit receiving one of said tuned selected channels for storing and playing back said tuned selected channel and a multiplexer receiving said plurality of tuned selected channels, a plurality of descrambled signals, said audio/video signal, and a stored tuned selected channel for multiplexing into a multiplexed signal in response to said multiplex control signal from said central processor.

5. The apparatus of claim 4, wherein said mass storage unit is an optical disk.

6. The apparatus of claim 1, wherein said multiplexer performs time multiplexing.

7. The apparatus of claim 1, wherein said multiplexer performs frequency multiplexing.

8. The apparatus of claim 1, further comprising a data card and a data port receiving operating data from the central processing unit for providing the operating data to a data receiving audio/video system component.

9. The apparatus of claim 8, wherein said data receiving audio/video system component is a videocassette recorder.

10. A computer apparatus receiving an audio/video signal for controlling, in response to user input, an audio/video system including a plurality of audio/video components, comprising:

a central processor receiving said user input;

a plurality of tuners receiving a respective plurality of tuner control signals from said central processor for tuning a plurality of selected channels from among a plurality of channels present in said audio/video signal;

a plurality of descramblers receiving a respective plurality of descrambler control signals from said central processor and a respective plurality of tuned selected channels for descrambling said plurality of tuned selected channels when said plurality of tuned selected channels have been scrambled;

a multiplexer receiving a multiplexer control signal from said central processor and said plurality of tuned selected channels, a plurality of descrambled signals, and said audio/video signal for multiplexing into a multiplexed signal in response to the multiplexer control signal;

a data card and a data port receiving operating data and transmission data from said central processor for outputting the operating data and transmission data;

a transmitter receiving said transmission data from said data card and said data port and the multiplexed signal output from the multiplexer for transmitting portions of the multiplexed signal; and a plurality of receivers connected to respective ones of said plurality of audio/video components for receiving respective portions of the multiplexed signal transmitted by the transmitter and for supplying the received portions of the multiplexed signal to the plurality of audio/video components.

11. The apparatus of claim 10, wherein said computer includes a keyboard for receiving said user input.

12. The apparatus of claim 10, wherein said plurality of descramblers are adapted to descramble said plurality of tuned selected channels only after being provided with an access code from said central processor.

13. The apparatus of claim 10, wherein said operating data is received from said data port by a videocassette recorder.

14. The apparatus of claim 10, further comprising a mass storage unit receiving one of said tuned selected channels for storing and playing back said tuned selected channel in response to a storage control signal from said central processor and a multiplexer receiving said multiplexer control signal and the plurality of tuned selected channels, a plurality of descrambled signals, said audio/video signal, and a stored tuned selected channel for multiplexing into a multiplexed signal in response to the multiplexer control signal.

15. The apparatus of claim 14, wherein said mass storage unit is an optical disk.

16. The apparatus of claim 10, wherein said transmitter operates in a radio-frequency band.

17. A method of controlling, in response to user input, and audio/video system including a plurality of components, comprising:

receiving said user input;

receiving an audio/video signal;

tuning a selected plurality of channels present in said audio/video signal in response to said user input;

descrambling said tuned selected plurality of channels present in said audio/video signal to produce a plurality of descrambled signals in response to said user input;

multiplexing said tuned selected plurality of channels, said plurality of descrambled signals, and said audio/video signal into a multiplexed signal in response to said user input; and receiving said multiplexed signal and demultiplexing one of said tuned selected plurality of channels, one of said plurality of descrambled signals, said stored selected channel, or said audio/video signal for input to each one of said components.

\* \* \* \* \*